US007079940B2

(12) United States Patent
Scholt et al.

(10) Patent No.: US 7,079,940 B2
(45) Date of Patent: Jul. 18, 2006

(54) METHOD FOR AUTOMATICALLY STOPPING AN INTERNAL COMBUSTION ENGINE WITH A VARIABLE STOPPING DELAY

(75) Inventors: Torsten Scholt, Stuttgart (DE); Andreas Schondelmaier, Erdmannshausen (DE); Matthias Schorpp, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/009,940

(22) Filed: Dec. 13, 2004

(65) Prior Publication Data
US 2005/0143901 A1 Jun. 30, 2005

(30) Foreign Application Priority Data
Dec. 11, 2003 (DE) .............................. 103 57 934

(51) Int. Cl.
*B60K 6/04* (2006.01)
*F02D 29/02* (2006.01)
*F02N 11/04* (2006.01)

(52) U.S. Cl. .................. 701/112; 123/179.15
(58) Field of Classification Search ................ 701/112; 123/179.15, 179.21
See application file for complete search history.

(56) References Cited

U.S. PATENT DOCUMENTS 3,675,033 A * 7/1972 Richard et al. ......... 123/179.21
4,034,335 A * 7/1977 Harazoe et al. ............. 123/397

FOREIGN PATENT DOCUMENTS

DE 199 25 230 A1 12/1999
JP 2000-329039 * 11/2000

* cited by examiner

*Primary Examiner*—Hieu T. Vo
(74) *Attorney, Agent, or Firm*—Norman N. Kunitz, Esq.; Fitch, Even, Tabin & Flannery

(57) ABSTRACT

A control method for an internal-combustion engine, working with a variable stopping delay. The stopping delay is essentially affected by the following parameters:
- the operational mode selected for the internal-combustion engine,
- the previous driving mode based on a driver-type classification,
- the past speed profile,
- the navigational data of GPS-systems, traffic guiding systems and digital street maps, and
- the actual braking pressure.

11 Claims, 3 Drawing Sheets

METHOD FOR AUTOMATICALLY STOPPING AN INTERNAL COMBUSTION ENGINE WITH A VARIABLE STOPPING DELAY

CROSS REFERENCE TO RELATED APPLICATION

This application claims the priority of German Patent Application No. 103 57 934.6, filed on Dec. 11, 2003, the subject matter of which, in its entirety, is incorporated herein by reference.

FIELD OF THE INVENTION

The invention relates to a universal control and coordination of a vehicle having a power plant including an internal-combustion engine (a spark ignition engine or a diesel engine), an electric machine (a concentrically or laterally arranged starter generator) and a transmission. The control encompasses the integration of a reliable, convenient, automatic stopping and starting function, including a variable stopping delay for fuel economy. The invention is directed to the variable stopping delay.

BACKGROUND OF THE INVENTION

A stopping device effecting an automatic stopping of the internal-combustion engine of an automotive vehicle when predetermined engine-stopping conditions are met and effecting an engine restart when predetermined restarting conditions are met, is disclosed, for example, in German Patent Application No. DE 199 25 230 A1. This application also describes a regulating process, by means of which the internal-combustion engine may be automatically stopped. Such a regulating process constitutes the genus in the preamble of the independent claim. Thus, it is known to monitor and evaluate certain communication signals with a control device and an implemented application program in the on-board network of an automotive vehicle. An automatic stopping step is initiated in case the vehicle speed is zero, the accelerator is off, the brake is applied, the battery charge exceeds a predetermined value and if all pre-set conditions during a predetermined maintenance period are fulfilled.

Stopping delays operating with fixed, predetermined maintenance periods, until the internal-combustion engine is eventually stopped, have presently not met with wide acceptance. A reason therefore might be found in the unlike sense of time of the different drivers. Another reason resides in all probability in the fact that fixed predetermined maintenance periods can certainly not satisfy all possible driving conditions of an automotive vehicle. It is therefore an object of the invention to provide a remedy by means of an improved control process.

SUMMARY OF THE INVENTION

The above object generally is accomplished according to the present invention by a process or method of automatically stopping an internal-combustion engine of an automotive vehicle, including the steps of evaluating, prior to engine-stopping, by means of a control unit and an application program, the communication signals relating to the actual operating conditions of the vehicle, and if predetermined stopping condition are present, automatically stopping the engine by the application program and the control device after a predetermined stopping delay, and wherein the period of the stopping delay is variable and is determined by an automatic condition controller dependent from actual communication signals relating to the operation of the vehicle.

Advantageous further features are contained in the dependent claims, the drawing and the description of the embodiments.

The object of the invention is achieved mostly by a control process which operates with a variable stopping delay affected primarily by the following parameters:

the operational mode selected for the internal-combustion engine;

the previous driving mode based on a driver-type classification;

the past speed profile;

the navigational data of GPS-systems, traffic guiding systems and digital street maps; and, the actual braking pressure.

The advantages primarily achieved by the invention reside by adapting the stopping delay to the actual driver of the motor vehicle and the actual traffic conditions in which the motor vehicle finds itself. The adaptation to the driver leads to a higher acceptance of the automatically performed stopping process, while the adaptation to the traffic condition in which the motor vehicle finds itself, provides for a higher operational safety of the motor vehicle. Thus, it is possible, for example, to prevent an automatic engine-stopping by means of an evaluation of the navigational data, if the vehicle stops at an intersection due to a traffic jam.

The embodiment illustrated in FIG. 2 provides that the driver may himself/herself make the selection whether or not to activate the automated engine-stopping process.

In the description which follows, the invention is set forth in further detail, without limiting the general scope of the invention, in conjunction with the drawing.

DETAILED DESCRIPTION OF THE INVENTION

Figure 1:
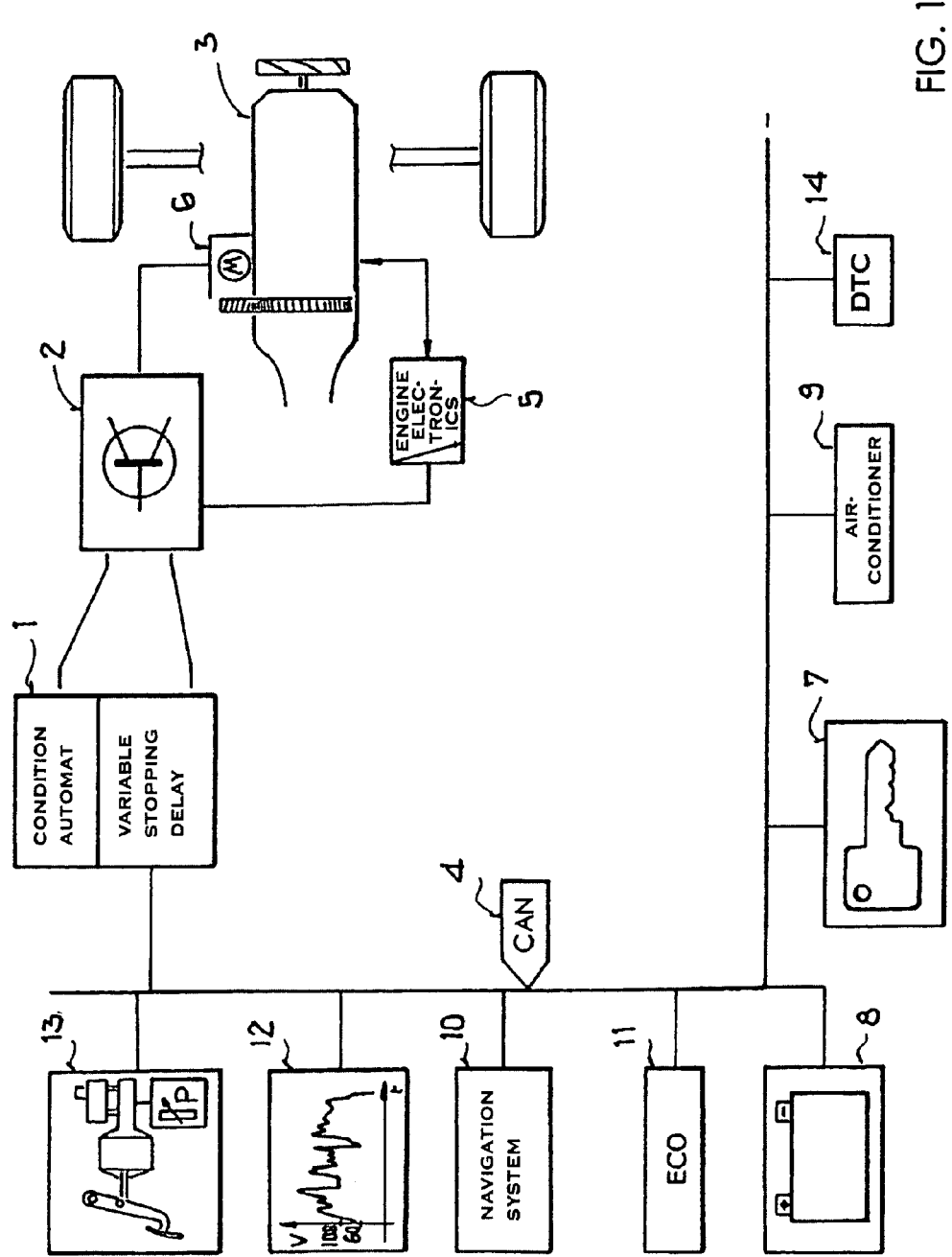
FIG. 1 is a schematic overview showing the essential features of the automatic engine-stopping system.

FIG. 1 shows an overview of essential features of the invention. The central element is a condition automat or automatic condition controller 1 that is integrated as a software control program in a control device 2. The automatic condition controller affects the control functions of an internal-combustion engine 3. The control presupposes that the automatic condition controller is connected with all the relevant bus systems 4 in the vehicle and thus has access to all the necessary sensor and control magnitudes. The automatic condition controller may be the separate control device 2 or may be integrated with its functions, entirely or in part, in the already present control devices of the engine-electronics 5. For obtaining a stopping and starting function having a variable engine-stopping delay, it is also feasible to communicate with, and actuate an electric starter 6 by means of the automatic condition controller. The automatic condition controller coordinates the following functions: it examines whether the motor vehicle was started with the ignition key 7 and how much time has elapsed since such a first start. Before an automatic engine-stopping by means of the automatic condition controller can be considered, a sufficient minimum period from the first start has to lapse. This is advantageous for affording the internal-combustion engine the possibility to reach its minimum operating temperature. Such an examination may be complemented by calling up the already attained operating temperature of the internal-combustion engine. A stopping and restarting of the internal-combustion engine during the heat-up period by means of the automatic condition controller would have a negative effect on the exhaust gas emission of the engine, because the heat-up phase of the engine operation would be significantly extended.

The automatic condition controller inquires whether or not a battery regulator 8 indicates a sufficient charge condition of the starting battery. In case the residual charge present in the starting battery is no longer sufficient for performing several stops and starts of the internal-combustion engine, then an automatic stopping of the engine is prevented by the automatic condition controller.

Further, the automatic condition controller is connected with the control device of the air conditioner 9. By inquiring of that control device, it is determined whether or not the air conditioner is switched on. In case the air conditioner is on, it is determined whether or not the temperature inside the vehicle is within an acceptable tolerance range. Further, the level of humidity is determined, and whether or not upon engine-stopping the accompanying shutdown of the dehumidifier of the air conditioner introduces the risk of condensation on the windows. In case the temperature lies outside the tolerance range, an automatic stopping of the engine is prevented by the automatic condition controller.

Further, the automatic condition controller is connected with a navigation system 10, if available in the vehicle. Based on the navigational data of GPS-systems, traffic guide systems and digital street maps, the navigation system determines and makes available the actual position of the vehicle and the actual traffic conditions. This information may be evaluated and utilized by the automatic condition controller for determining the variable engine-stopping delay. In case the vehicle is in the process of negotiating a curve or passing through an intersection, an automatic stopping would cause a significant disturbance. In such a case an automatic stopping of the engine is prevented by the automatic condition controller. Further, however, based on navigational data it also may be determined whether the vehicle is in a traffic jam. In such a case the variable engine-stopping delay may be set by the automatic condition controller to the smallest value, and, for obtaining a substantial fuel economy, it is desirable to automatically stop the engine as often as possible.

Further, the automatic condition controller may determine by means of a bus inquiry whether an "ECO-selector" 11 is available and whether it was actuated. In vehicles having an ECO-selector it is feasible to influence the operating mode of the engine: The driver may make a selection between an economical and a power-oriented operation of the engine. In case the ECO-selector was actuated and the driver selected an economical engine operation, then a short stopping delay is set. If, on the other hand, a power-oriented engine operation is selected, then the automatic condition controller sets and applies a long stopping delay.

A further influencing factor for determining a variable stopping delay is the past speed profile 12 with which the vehicle moved before the engine-stopping process. The speed profile may be obtained either from the electronic system of the engine or may have already been prepared by an onboard utility computer and may be accessed therefrom. Present utility computers determine the average speed traveled since the first start and the traveled average speed since the last reset. The computer may also calculate, however, the average speed traveled during the last 10 minutes. The automatic condition controller can thus affect the variable stopping delay based on the selected average speed. In case of high average speeds of, for example, over 100 km/hour, the automatic condition controller selects a long stopping delay, while in case of low speeds of, for example, less than 60 km/hour, a short stopping delay is selected. In the intermediate speed range, an average stopping delay is selected.

A further influence on the variable stopping delay is effected by the braking system 13. The actual braking pressure in the braking system of the motor vehicle is ascertained by suitable sensors which may be pedal path sensors determining how far the brake pedal was depressed or pressure sensors directly determining the hydraulic braking pressure. A high braking pressure calls for a short stopping delay, while a small braking pressure calls for a long stopping delay. By virtue of the function of the braking pressure determination by the automatic condition controller, the driver, with his/her foot, may intuitively or deliberately affect the stopping delay.

Lastly, a driver-type classification system (designated as DTC in FIG. 1) 14, if available, may be utilized by the automatic condition controller for influencing the variable stopping delay. Driver-type classifications are implemented in particular in connection with adaptive, automatic transmission controls in motor vehicles. The driver-type classification system detects driver behavior and classifies it according to vigorous or less vigorous driving criteria. A driver-type classification thus consists of a gradual division of, for example, 0–255. Conventionally, the high end of the range stands for a highly vigorous driver, while the low end represents a very cautious driver. For the automatic condition controller this means that the smaller the value of the driver-type classification, the shorter the selected variable stopping delay.

Figure 2:
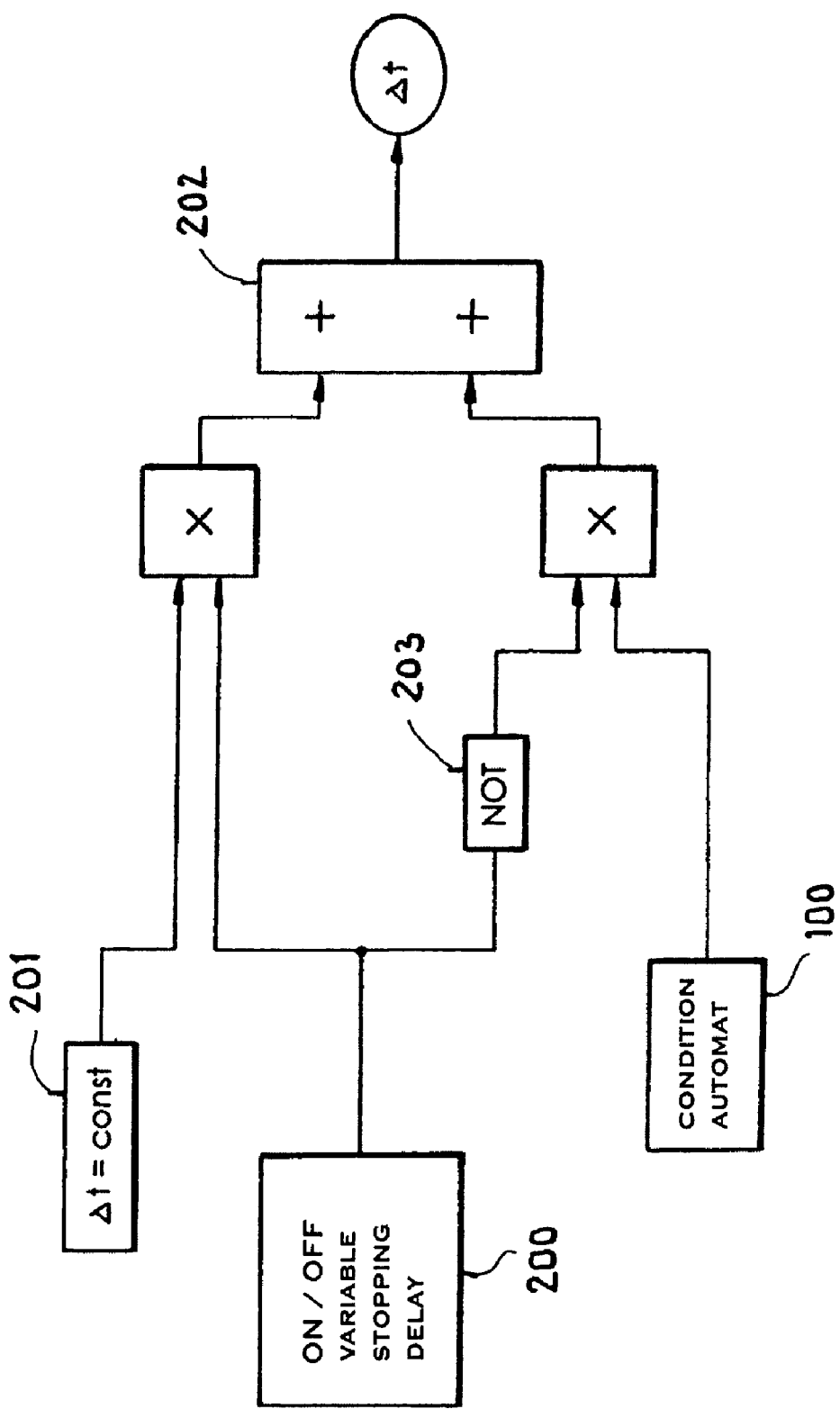
FIG. 2 is a circuit diagram for activating and deactivating the automatic system.

It is the principal task of the automatic condition controller to determine and set the length of time of the variable stopping delay. In case the driver does not wish an automatic stopping of the engine, he/she has the choice to switch off the variable stopping delay. A possibility to obtain such a result is illustrated in FIG. 2. By means of a two-stage switch 200, which, dependent on the switching position, delivers at its output a bivalent (either "high" or "low") signal, the driver may choose between a constant stopping delay 201 and a variable stopping delay which is determined by the automatic condition controller 100. In case a logic "1" for "high" appears at the output of the on/off switch 200, the logical time constant 201 is multiplied with such a value and applied to an adder 202. In a parallel path the output of the logic switch is inverted in a negating element 203, and the inverted value is multiplied with the output of the automatic condition controller 100. The resulting product too, is applied to the adder 202. If the logic output of the on/off switch is "1", the output of the automatic condition controller 100 is multiplied with the value "0" after inversion, so that the variable stopping delay determined by the automatic condition controller can no longer contribute to the adder 202. Thus, at the output of the adder 202 the constant delay is present. Conversely, when the logic output of the on/off switch has the value "0", the constant delay 201 is multiplied with the value "0", and in the parallel path the logic value "0" is transformed by inversion to the logic value "1" and is multiplied with the output of the automatic condition controller 100. In such a case the variable stopping delay from the automatic condition controller 100 prevails in the adder 202, while the constant stopping delay has no contribution thereto. At the output then the value for the variable stopping delay appears. The circuit having an on/off switch as it has just been discussed above, may be a pushbutton connected to a communication bus. Whether or not the output of the automatic condition controller is activated thus depends upon the position of the pushbutton.

Figure 3:
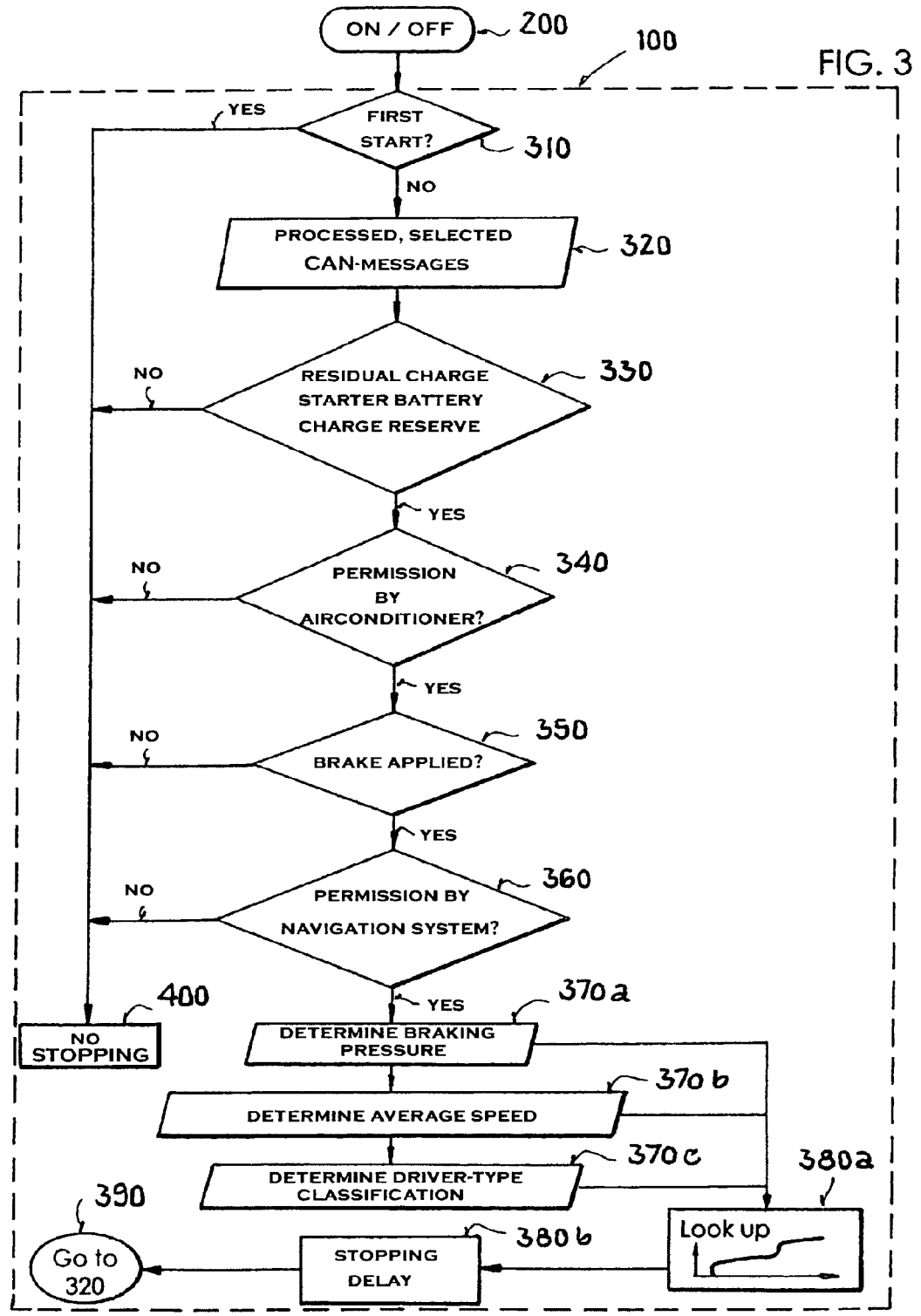
FIG. 3 is a flow chart showing the essential decisions and computing modules for providing a variable stopping delay.

FIG. 3 once again makes reference to the automatic condition controller proper, as it has already been discussed in conjunction with FIG. 1. FIG. 3 illustrates an exemplary flow chart which may be implemented as an application program in a control apparatus and which indicates in what order the communication signals in the communication network of the motor vehicle are to be processed and evaluated by the automatic condition controller. Dependent on whether or not the automatic condition controller 100 is activated by a corresponding actuation of the on/off switch 200, a variable stopping delay is determined according to the flow chart of FIG. 3. If the automatic condition controller is activated, in a first decision step 310 it is examined and decided whether a first start of the internal-combustion engine occurred and how much time elapsed since such a first start. If a first start occurred or if the engine has not run for a sufficient period to attain its operating temperature, a stopping of the engine is prevented. For this purpose the automatic condition controller transmits a signal 400 which provides that no engine stoppage should occur. If no first start is signaled, the automatic condition controller takes the next process step 320 by forwarding the communication signals and communication messages to the communication buses of the motor vehicle and further processes selected messages, preferably CAN messages. Up-to-date communication networks in motor vehicles are preferably CAN bus systems.

In the process step 330 the automatic condition controller evaluates the signals of the battery control device. It is examined whether or not the actually present residual charge of the starter battery exceeds a predetermined charge reserve. In case the residual charge still present in the starter battery is below the charge reserve, an automatic stopping of the engine is prevented. If, however, the residual charge of the starter battery is greater than a predetermined charge reserve, in the next process step 340 it is examined whether or not the control device of the air conditioner permits a potential automatic stopping of the engine. Such a permission by the control device of the air conditioner depends primarily from the relative humidity. If there are risks that upon stopping the engine and an inherent switch-off of the dehumidifier of the air conditioner condensation will appear on the windows, an automatic stopping of the engine is prevented. In case a potential automatic stopping of the engine is permitted by the air conditioner, the process step 350 examines whether or not at least one brake (the handbrake or the travel brake) is active. If no brake is active, an automatic stopping of the engine is prevented. If one brake is applied to a sufficient extent, the next process step 360 inquires whether a navigation system permits an automatic stopping of the engine. The process step 360 mainly inquires about the actual travel conditions of the vehicle. If the actual travel conditions do not permit an engine stoppage, such stoppage will be prevented by the automatic condition controller. In case all the process steps up to this point have determined that an automatic stopping of the engine may be safely effected, in the next process step 370a the actually applied braking pressure is determined. At the same time the further process steps 370b and 370c call up and determine the previous average speed and the actual driver-type classification. By means of a multi-dimensional table 380a which is stored in the automatic condition controller, the variable stopping delay is determined and read out based on the applied braking pressure, the previous average speed and the driver-type classification. After a restart of the engine the above-described process runs repetitively and begins with step 320.

For the sake of completeness the automatic engine restart will be briefly discussed. For an automatic engine restart the following conditions have to be met:

The vehicle hood must be closed.

The gas pedal must not be actuated.

The brake pedal has to be released.

The vehicle doors must be closed.

The transmission must not be set in reverse gear.

The seatbelt at the driver's seat must be fastened.

With the above conditions the function of the automatic condition controller operating with a variable stopping delay may be extended to include an automatic engine start.

It will be appreciated that the above description of the present invention is susceptible to various modifications, changes and adaptations, and the same are intended to be comprehended within the meaning and range of equivalents of the appended claims.

What is claimed is:

1. A method of automatically stopping an internal-combustion engine of an automotive vehicle, including the steps of evaluating, prior to engine-stopping, by use of a control unit and an application program, communication signals relating to the actual operating conditions of the vehicle; and, if predetermined stopping conditions are present, automatically stopping the engine, by the application program and the control device, after a predetermined stopping delay, and wherein the period of the stopping delay is variable and further including determining the variable period of the stopping delay by an automatic condition controller dependent from actual communication signals relating to the operation of the vehicle.

2. The method as defined in claim 1, wherein the automatic condition controller is a control device having an implemented application program.

3. The method as defined in claim 1, wherein the communication signals for determining the variable stopping delay contain information concerning the applied braking pressure, the previous average speed, messages from a navigation system, the operational mode of the engine, the residual charge of the starter battery, the first start of the engine, the operating state of the air conditioner or the driver-type classification.

4. The method as defined in claim 3, further including interrupting the stopping process if the residual charge of the starter battery is less than a predetermined charge reserve, during operation of the air conditioner, the actual relative humidity would cause condensation on the window panes, the brake is not applied, the navigation system issues orders for a change in direction, or after a first start the engine has not yet reached its minimum operating temperature.

5. The method as defined in claim 1, further including selectively switching the automatic condition controller on and off.

6. The method as defined in claim 1, wherein said step of determining includes causing the stopping delay last at least 5 seconds in case the previous average speed was at least 100 km/hour.

7. The method as defined in claim 1, wherein said step of determining includes causing the stopping delay to last between 1 second and 5 seconds, in case the previous average speed was between 60 and 100 km/hour.

8. The method as defined in claim 1, wherein said step of determining includes causing the stopping delay to last between 0.5 and 1 second in case the previous average speed was below 60 km/hour.

9. The method as defined in claim 1, wherein said step of determining includes shortening the stopping delay as the braking pressure is increased.

10. The method as defined in claim 1, including basically setting the stopping delay to the shortest settable value, in case the economy mode is selected for the operational mode of the engine.

11. The method as defined in claim 1, wherein said step of determining includes providing a driver-type classification from the communication signals, and selecting the stopping delay so that the more vigorous the driver-type classification, the longer the selected stopping delay.

* * * * *